United States Patent Office 3,551,407
Patented Dec. 29, 1970

3,551,407
MONOAZO DYES DERIVED FROM
AMINOPHTHALIMIDES
Johannes Dehnert and Gerhard Gnad, Ludwigshafen
(Rhine), Germany, assignors to Badische Anilin- &
Soda-Fabrik Aktiengesellschaft, Ludwigshafen (Rhine),
Germany
No Drawing. Filed Apr. 16, 1968, Ser. No. 721,587
Claims priority, application Germany, Apr. 19, 1967,
1,644,058; Mar. 6, 1968, 1,719,062
Int. Cl. C09b 29/36; D06p 1/02
U.S. Cl. 260—152                                    2 Claims

ABSTRACT OF THE DISCLOSURE

Monoazo dyes derived from 3-aminophthalimides or 4-aminophthalimides and naphthalene sulfonic acids which are especially useful for dyeing synthetic polyamides.

This invention relates to new monoazo dyes having the general Formula I:

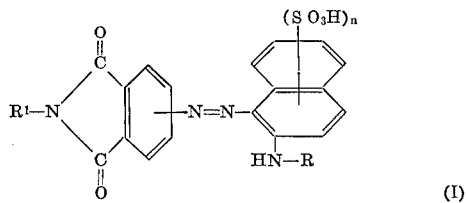

(I)

in which R denotes a hydrogen atom or an unsubstituted or substituted aliphatic, cycloaliphatic or araliphatic radical, $R^1$ denotes a hydrogen atom or an unsubstituted or substituted aliphatic, cycloaliphatic, araliphatic or aromatic radical and $n$ denotes one of the integers 1 and 2.

The radical $R^1$, in addition to being a hydrogen atom, may be for example methyl, ethyl, 1-propyl, 2-propyl, 1-butyl, 2-butyl, tert-butyl, pentyl, hexyl, 2-ethylhexyl, octyl, decyl, cyclohexyl, cyclooctyl, norbornyl, dicyclopentadienyl, tricylopentadienyl, benzyl, 1-phenylethyl, 2-phenylethyl, phenyl, 2-methylphenyl, 3-methylphenyl, 4-methylphenyl, 2,4-dimethylphenyl, 3,5-dimethylphenyl, 1-naphthyl or 2-naphthyl.

The said radicals may in turn bear other substituents, for example chlorine atoms, bromine atoms or hydroxy, methoxy, ethoxy, phenoxy, carboxy, carboxylic ester, carbamoyl, sulfonamide, nitrile, acetoxy amino, acetamino, benzoylamino or benzoyloxy groups. Specific examples of substituents on the nitrogen atom are β-hydroxyethyl, β-methoxyethyl, gamma-hydrodypropyl, gamma-methoxypropyl, β-acetoxyethyl or β-chloroethyl.

Compounds which are derived from 3-aminonaphthalimides are preferred.

Examples of the radical R, in addition to a hydrogen atom, are methyl, ethyl, 1-propyl, 2-propyl, 1-butyl, 2-butyl, hexyl, octyl, cyclohexyl, cyclooctyl, benzyl or phenylethyl. This radical may also bear substituents, for example chlorine atoms or hydroxy, methoxy, ethoxy, phenoxy, or carboxy groups.

Examples of 2-aminonaphthalene monosulfonic and disulfonic acids (coupling components) are:

2-aminonaphthalene-5-sulfonic acid,
2-aminonaphthalene-6-sulfonic acid,
2-aminonaphthalene-7-sulfonic acid,
2-aminonaphthalene-8-sulfonic acid,
2-aminonaphthalene-3,6-disulfonic acid,
2-aminonaphthalene-4,8-disulfonic acid,
2-aminonaphthalene-5,7-disulfonic acid or
2-aminonaphthalene-6,8-disulfonic acid.

Examples of N-substituted 2-aminonaphthalenesulfonic acids are:

N-methyl-2-aminonaphthalene-5-sulfonic acid,
N-ethyl-2-aminonaphthalene-5-sulfonic acid,
N-n-propyl-2-aminonaphthalene-5-sulfonic acid,
N-n-butyl-2-aminonaphthalene-5-sulfonic acid,
N-isobutyl-2-aminonaphthalene-5-sulfonic acid,
N-n-hexyl-2-aminonaphthalene-5-sulfonic acid,
N-cyclohexyl-2-aminonaphthalene-5-sulfonic acid,
N-2-ethylhexyl-2-aminonaphthalene-5-sulfonic acid,
N-benzyl-2-aminonaphthalene-5-sulfonic acid,
N-β-phenylethyl-2-aminonaphthalene-5-sulfonic acid,
N-2′-hydroxyethyl-2-aminonaphthalene-5-sulfonic acid,
N-2′-hydroxypropyl-2-aminonaphthalene-5-sulfonic acid,
N-3′-hydroxypropyl-2-aminonaphthalene-5-sulfonic acid,
N-3′-methoxypropyl-2-aminonaphthalene-5-sulfonic acid,
N-omega-hydroxyethyl-2-aminonaphthalene-5-sulfonic acid and the corresponding derivatives of 2-aminonaphthalene-6-sulfonic acid, -7-sulfonic acid or -8-sulfonic acid and the corresponding derivatives of 2-aminonaphthalene, 5,7-disulfonic acid, 3,6-disulfonic acid, 4,8-disulfonic acid or 6,8-disulfonic acid. Compounds derived from 2-aminonaphthalene-5-sulfonic acid and from 2-aminonaphthalene-5,7-disulfonic acid are preferred.

A preferred group of dyes has the general Formula II:

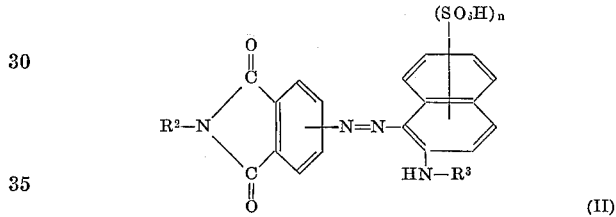

(II)

in which $n$ denotes one of the integers 1 and 2, $R^2$ denotes an alkyl radical having one to eight carbon atoms which may bear as a substitutent a hydroxy, low molecular weight alkoxy, acetoxy, carboxy group or a chlorine atom, a cycloalkyl radical having six to eight carbon atoms, a benzyl radical or a phenylethyl radical, a phenyl radical, a phenyl radical bearing a chlorine atom or a methyl, ethyl or methoxy group as a substituent, or a naphthyl radical and $R^3$ denotes a hydrogen atom or an alkyl radical having one to eight carbon atoms which may bear a hydroxy radical or a low molecular weight alkoxy radical as a substituent, a cyclohexyl radical, a benzyl group a β-phenylethyl group.

Dyes having the general Formula III:

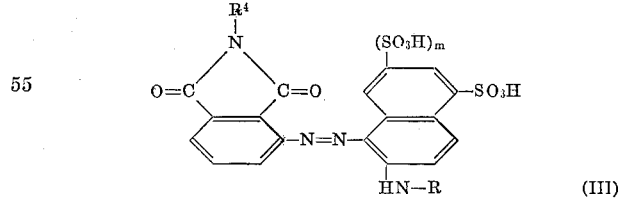

(III)

in which $m$ denotes zero or 1, $R^4$ denotes a methyl, ethyl, propyl, butyl, hexyl, 2-ethylhexyl, cyclohexyl, benzyl, phenylethyl, phenyl, hydroxyethyl, hydroxypropyl, dihydroxypropyl, omega-hydroxyhexyl, methoxyethyl, ethoxyethyl, methoxypropyl, ethoxypropyl, acetoxyethyl, acetoxypropyl, chloroethyl, chlorophenyl, methoxyphenyl, ethoxyphenyl or methylphenyl radical and $R^5$ denotes a hydrogen atom or a methyl, ethyl, propyl, butyl, hexyl, 2-ethylhexyl, cyclohexyl, benzyl, phenylethyl, hydroxyethyl, hydroxypropyl, dihydroxpropyl, omega-hydroxyhexyl, methoxyethyl, ethoxyethyl, methoxypropyl or ethoxypropyl radical are particularly valuable.

The new dyes having the Formula I may be prepared for example by coupling a diazo compound of an amine having the general Formula IV:

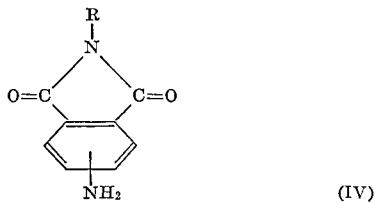

in which $R^1$ has the above meaning with a compound having the Formula V;

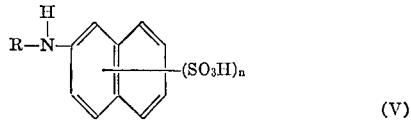

in which R and $n$ have the above meanings.

The compounds having the Formula IV, depending on the type of substituents, may be diazotized in a conventional manner in dilute hydrochloric acid or dilute sulfuric acid or in water or in a mixture of water with an organic solvent, for example glacial acetic acid. Diazotization may also be carried out in concentrated sulfuric acid.

Coupling is carried out in the weakly acid range.

The new dyes give orange red to red dyeings having very good light fastness properties on wool, silk or synthetic polyamide or polyurethane fibers from a neutral to acid dye liquor. Dyeings having adequate to very good leveling power and dyeings having good to very good wet fastness properties are obtained depending on the type of substituents.

Dyeings having excellent fastness properties are obtained in particular on textile material of synthetic polyamides, such as nylon 6 or nylon 6,6 or condensation products of similar structure.

The invention is further illustrated by the following examples. Parts and percentages given in the examples are by weight.

EXAMPLE 1

25 parts by volume of concentrated hydrochloric acid and 100 parts of ice are added to a finely divided suspension 20.6 parts of 3-aminophthalic-$\beta$-hydroxyethylimide in 200 parts of water while stirring. 30 parts by volume of 23% sodium nitrite solution is allowed to flow in beneath the surface of the mixture with simultaneous external cooling and the whole is stirred for another two hours at 0° to 5° C.

While continuing the external cooling of the diazotization mixture, a solution of 24 parts of 2-aminonaphthalene-5-sulfonic acid in 500 parts of water, which has been adjusted to a pH value of 7 with caustic soda solution, is added. When coupling is over, the precipitated dye is isolated by suction filtration and washing with a small amount of water. It is then dried at 100° C. A red powder is obtained which dissolves in water to give a yellowish red color and which dyes polycaprolactam cloth pure scarlet shades having outstanding light fastness and very good wet fastness.

Using the diazo components and coupling components set out in the following table and adopting an analogous procedure, dyes having similar tinctorial properties are obtained. In the table, E=Example No.; and Shade=Shade of the dyeing on wool and polycaprolactam.

| E | Diazo component | Coupling component | Shade |
|---|---|---|---|
| 2 | 3-aminophthalic-$\beta$-hydroxyethylimide | 2-aminonaphthalene-8-sulfonic acid | Orange. |
| 3 | 4-aminophthalic-$\beta$-hydroxyethylimide | 2-aminonaphthalene-5-sulfonic acid | Red. |
| 4 | 3-aminophthalimide | do | Scarlet red. |
| 5 | 4-aminophthalimide | do | Red. |
| 6 | 3-aminophthalic-$\gamma$-hydroxypropylimide | do | Scarlet red. |
| 7 | 3-aminophthalic-$\beta$-hydroxypropylimide | do | Do. |
| 8 | 3-aminophthalic-$\gamma$-methoxypropylimide | do | Do. |
| 9 | 4-aminophthalic-$\gamma$-methoxypropylimide | do | Red. |

EXAMPLE 10

30 parts by volume of 23% aqueous sodium nitrite solution is allowed to flow slowly into a solution of 21.8 parts of 3-aminophthalic-n-butylimide in 300 parts by volume of glacial acetic acid and 25 parts by volume of concentrated hydrochloric acid at 3° to 8° C. while stirring. 100 parts of ice is added during the addition of the sodium solution. The whole is then stirred for another two hours at 0° to 5° C. and a pH value of 4 is set up by adding a 50% solution of sodium acetate. A solution of the sodium salt of 23.4 parts of 2-aminonaphthaline-5-sulfonic acid in 300 parts by volume of water is added to the diazo solution. When coupling is over, the precipitated dye is suction filtered, washed with 10% common salt solution and dried. A red powder is obtained which dissolves in water with a red color and dyes polycaprolactam or woolen cloth pure scarlet red shades having very good light and wet fastness properties.

Other dyes having similar tinctorial properties are obtained in an analogous manner from the diazo components and coupling components given in the following table in which E=Example No. and Shade=Shade of the dyeing on wool or polycayprolactam:

| E | Diazo component | Coupling component | Shade |
|---|---|---|---|
| 11 | 3-aminophthalicisopropylimide | 2-aminonaphthalene-5-sulfonic acid | Scarlet red. |
| 12 | 3-aminophthalicbutylimide | 2-aminonaphthalene-6-sulfonic acid | Do. |
| 13 | do | 2-aminonaphthalene-7-sulfonic acid | Do. |
| 14 | do | 2-aminonaphthalene-8-sulfonic acid | Orange. |
| 15 | 3-aminophthalic-$\beta$-ethylhexylimide | 2-aminonaphthalene-5-sulfonic acid | Scarlet red. |
| 16 | 3-aminophthalic-$\omega$-hydroxyhexylimide | do | Do. |
| 17 | 3-aminophthalic-$\beta$-acetoxyethylimide | do | Do. |
| 18 | 3-aminophthalic-$\beta$-methylcarbamoyloxyethylimide. | do | Do. |
| 19 | 3-aminophthalic-$\beta$-benzoyloxyethylimide | do | Do. |
| 20 | 3-aminophthalicbenzylimide | do | Do. |
| 21 | 3-aminophthalic-$\beta$-phenylethylimide | do | Do. |
| 22 | 3-aminophthaliccyclohe ylimide | do | Do. |
| 23 | do | 2-aminonaphthalene-3,6-disulfonic acid | Do. |
| 24 | do | 2-aminonaphthalene-4,8-disulfonic acid | Orange. |
| 25 | do | 2-aminonaphthalene-5,7-disulfonic acid | Do. |
| 26 | do | 2-aminonaphthalene-6,8-disulfonic acid | Do. |
| 27 | 4-aminophthaliccyclohexylimide | 2-aminonaphthalene-5-sulfonic acid | Red. |
| 28 | 3-aminophthalicphenylamide | do | Scarlet red. |
| 29 | 4-aminophthalicphenylimide | do | Red. |

EXAMPLE 30

30 parts by volume of 10-normal hydrochloric acid and 100 parts of ice are added to a finely divided suspension of 20.6 parts of 3-aminophthalic-β-hydroxyethylimide in 100 parts of water. 30 parts by volume of 23% aqueous sodium nitrite solution is allowed to flow in beneath the surface of the mixture with simultaneous external cooling and the whole is stirred for another two hours at 0° to 5° C.

While continuing the external cooling, a solution of 24.8 parts of N-methylnaphthylamine-(2)-sulfonic acid-(5) in 300 parts by volume of water which has been adjusted to a pH value of 7 with 10% sodium carbonate solution is then added to the diazotization mixture and the pH value of the coupling mixture is adjusted to 4.5 by adding a concentrated aqueous solution of sodium acetate. When coupling is over, the precipitated dye is isolated by suction filtration and washed with a little water, followed by drying. A dark red powder is obtained which disolves in water with a red color and dyes polycaprolactam cloth pure red shade having outstanding light fastness and very good wet fastness.

By using the diazo components and the coupling cmponents set out in the following table and by adopting an analogous procedure, red dyes having similar tinctorial properties are obtained:

When the diazo components and coupling components set out in the following table are used and an analogous procedure is adopted, red dyes having similar tinctorial properties are obtained:

| E | Diazo component | Coupling component |
|---|---|---|
| 40 | 3-aminophthaliccyclohexylimide | N-methylnaphthylamine-(2)-sulfonic acid-(5). |
| 41 | 3-aminophthalic-β-ethylhexylimide | N-β-hydroxyethylnaphthylamine-(2)-sulfonic acid-(5). |
| 42 | do | N-methylnaphthylamine-(2)-sulfonic acid-(5). |
| 43 | do | N-methylnaphthylamine-(2)-sulfonic acid-(7). |
| 44 | 3-aminophthalicphenylimide | N-methylnaphthylamine-(2)-sulfonic acid-(5). |
| 45 | do | N-β-hydroxyethylnaphthylamine-(2)-sulfonic acid-(5). |
| 46 | do | N-β-hydroxyethylnaphthylamine-(2)-sulfonic acid-(6). |
| 47 | 3-aminophthalic-β'-phenylethylimide | N-β-hydroxyethylnaphthylamine-(2)-sulfonic acid-(5). |
| 48 | 3-aminophthalicisobutylimide | N-β-hydroxypropylnaphthylamine-(2)-sulfonic acid-(5). |
| 49 | 3-aminophthalic-ω-hydroxyhexylimide | ω-hydroxyhexylnaphthylamine-(2)-sulfonic acid-(5). |
| 50 | 3-aminophthalicbenzylimide | N-ω-hydroxyethylnaphthylamine-(2)-sulfonic acid-(5). |
| 51 | 3-aminophthalicnorbornylimide | Do. |
| 52 | 3-aminophthaliccyclooctylimide | N-β-hydroxyethylnaphthylamine-(2)-sulfonic acid-(6). |
| 53 | 3-aminophthalic-4'-chlorophenylimide | N-β-hydroxyethylnaphthylamine-(2)-sulfonic acid-(5). |
| 54 | 3-aminophthalic-3,5-dimethylphenylimide | Do. |
| 55 | 3-aminophthalic-4'-methoxyphenylimide | Do. |
| 56 | 3-aminophthalic-α-naphthylimide | Do. |
| 57 | 3-aminophthalic-β-chloroethylimide | Do. |

EXAMPLE 58

25.2 parts of 3-aminophthalic-4'-methylphenylimide is introduced into 75 parts of concentrated sulfuric acid at 10° to 15° C. with good stirring. After a clear solution has formed, 31 parts of 40% nitrosylsulfuric acid is allowed to flow in at 5° to 8° C. The whole is stirred for one hour at the same temperature and then the diazo solution is introduced into 200 parts of ice. The whole is stirred for fifteen minutes at 2° C. and then any excess of nitrous acid is destroyed in a conventional manner and a solution of the sodium salt of 28 parts of N-β-hydroxyethylnaphthylamine-(2)-sulfonic acid-(5) in 200 parts of water is introduced into the diazo solution. The whole is stirred for ninety minutes at 0° to 5° C. and then a pH value of 4 is set up in the coupling mixture by slow addition of a 20% solution of caustic soda. During the addition of caustic soda solution about 500 parts of ice is added in order to keep the temperature of the mixture at 0° to 5° C. When coupling is over, the precipitated dye is thoroughly suction filtered and dried. The dye is a red powder which dissolves in water to give a red color and produces on synthetic polyamide cloth red shades having very good fastness properties.

| E | Diazo component | Coupling component |
|---|---|---|
| 31 | 3-aminophthalic-β-hydroxyethylimide | N-β-hydroxyethylnaphthylamine-(2)-sulfonic acid-(5). |
| 32 | do | N-isobutylnaphthylamine-(2)-sulfonic acid-(5). |
| 33 | 3-aminophthalimide | Do. |
| 34 | 3-aminophthalic-γ-hydroxyethylimide | N-methylnaphthylamine-(2)-sulfonic acid-(7). |
| 35 | 3-aminophthalic-γ-methoxypropylimide | N-isobutylnaphthylamine-(2)-sulfonic acid-(5). |
| 36 | 3-aminophthalic methylimide | N-γ-ethoxypropylnaphthylamine-(2)-sulfonic acid-(5). |
| 37 | 3-aminophthalicethylimide | N-γ-methoxypropylnaphthylamine-(2)-sulfonic acid-(5). |
| 38 | 3-aminophthalic-β-hydroxypropylimide | N-ethylnaphthylamine-(2)-sulfonic acid-(5). |

EXAMPLE 39

30 parts by volume of 23% aqueous sodium nitrite solution is allowed to flow slowly while stirring at 3° to 8° C. into a solution of 21.8 parts of 3-aminophthalicbutylimide in 300 parts by volume of glacial acetic acid and 25 parts by volume of concentrated hydrochloric acid. 100 parts of ice is added during the addition of the sodium nitrite solution. The whole is then stirred for another two hours at 0° to 5° C. A solution of the sodium salt of 24.8 parts of N-methylnaphthylamine-(2)-sulfonic acid-(5) in 300 parts by volume of water is then added to the diazo solution. A pH value of 4 is then set up by adding a concentrated aqueous solution of sodium acetate. After coupling is over, the precipitated dye is suction filtered, washed with 10% common salt solution and dried at 70° C. A brick-red powder is obtained which dissolves in water with a red color and produces red shades having very good light and wet fastness properties on polycaprolactam cloth. Wool is also dyed in fast red shades by the dye.

EXAMPLE 59

20.6 parts of 3-aminophthalic acid-β-hydroxyethylimide is diazotized as described in Example 1. A solution of 29.2 parts of N-butylnaphthylamine-(2)-sulfonic acid-(6) in 300 parts by volume of water and 200 parts of dimethylformamide which has been adjusted to pH 7 with 10% sodium carbonate solution is added to the diazotization mixture at 0° to 5° C. A pH value of 4 is then set up in the coupling mixture by adding a concentrated aqueous solution of sodium acetate and, after coupling is over, the dye is isolated and dried in a conventional manner. A bright red powder is obtained which is soluoble in water to give a red color and which dyes nylon 6,6 cloth red shades having excellent light fastness and very good wet fastness.

By using the diazo components and coupling components given in the following table and adopting an analogous procedure, red dyes having similar tinctorial properties are obtained:

| E | Diazo component | Coupling component |
|---|---|---|
| 60 | 3-aminophthalic-β-hydroxyethylimide | N-cyclohexylnaphthylamine-(2)-sulfonic acid-(5). |
| 61 | do | N-benzylnaphthylamine-(2)-sulfonic acid-(5). |
| 62 | 3-aminophthaliccarboxymethylimide | N-β-phenylethylnaphthylamine-(2)-sulfonic acid-(5). |

We claim:

1. A monoazo dye having the formula

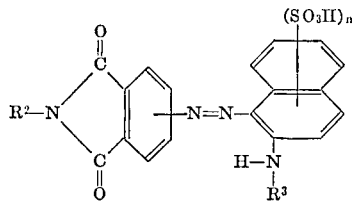

in which:
  $n$ denotes one of the integers 1 and 2;
  $R^2$ denotes hydrogen, alkyl of one to eight carbon atoms, hydroxyalkyl of one to eight carbon atoms, alkoxyalkyl of one to eight carbon atoms, acetoxyalkyl of one to eight carbon atoms, carboxyalkyl of one to eight carbon atoms, chloroalkyl of one to eight carbon atoms, cycloalkyl of six to eight carbon atoms, phenyl, benzyl, phenylethyl, chlorophenyl, methylphenyl, dimethylphenyl, ethylphenyl, methoxyphenyl, ethoxyphenyl, β-(N-methylcarbamoyloxy)-ethyl, β-benzoyloxyethyl, norbornyl or naphthyl; and
  $R^3$ denotes hydrogen, alkyl of one to eight carbon atoms, hydroxyalkyl of one to eight carbon atoms, alkoxyalkyl of one to eight carbon atoms, cyclohexyl, benzyl or phenylethyl.

2. A monoazo dye having the formula:

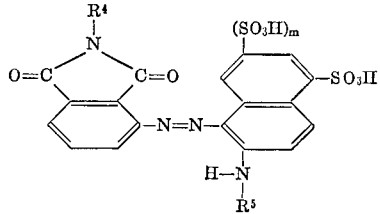

in which:
  $m$ denotes zero or 1,
  $R^4$ denotes one of the radicals: methyl, ethyl, propyl, butyl, hexyl, 2-ethylhexyl, cyclohexyl, benzyl, phenylethyl, phenyl, hydroxyethyl, hydroxypropyl, dihydroxypropyl, omega-hydroxyhexyl, methoxyethyl, ethoxyethyl, methoxypropyl, ethoxypropyl, acetoxyethyl, acetoxypropyl, chloroethyl, chlorophenyl, methoxyphenyl, ethoxyphenyl, or methylphenyl, and
  $R^5$ denotes a hydrogen atom or one of the radicals: methyl, ethyl, propyl, butyl, hexyl, 2-ethylhexyl, cyclohexyl, benzyl, phenylethyl, hydroxyethyl, hydroxypropyl, dihydroxypropyl, omega-hydroxyhexyl, methoxyethyl, ethoxyethyl, methoxy propyl or ethoxypropyl.

References Cited
UNITED STATES PATENTS 3,402,166    9/1968    Heckl et al. _____ 260—152

CHARLES B. PARKER, Primary Examiner

D. M. PAPUGA, Assistant Examiner

U.S. Cl. X.R.

260—326; 8—41, 55

PO-1050
(5/69)

UNITED STATES PATENT OFFICE
CERTIFICATE OF CORRECTION

Patent No. 3,551,407    Dated December 29, 1970

Inventor(s) Johannes Dehnert et al

It is certified that error appears in the above-identified patent and that said Letters Patent are hereby corrected as shown below:

Column 1, line 53, "gamma-hydrodypropyl" should read -- gamma-hydroxypropyl --.

Column 2, Formula III, "R" should read -- $R^5$ --.

Column 3, in the table, Example 22, "3-aminophthaliccyclo-heylimide" should read -- 3-aminophthaliccyclohexylimide --.

Column 6, in the table, Example 50, "ω" should read -- $\beta$ --; line 70, "soluoble" should read -- soluble --.

Signed and sealed this 4th day of May 1971.

(SEAL)
Attest:

EDWARD M. FLETCHER. JR.        WILLIAM E. SCHUYLER, J
Attesting Officer              Commissioner of Patent